June 7, 1927.

C. GRIFFIN 1,631,932

COMBINED COFFEE AND TEA POT

Filed Aug. 17, 1926

Inventor

Charles Griffin

By Lacey & Lacey, Attorneys

Patented June 7, 1927.

1,631,932

UNITED STATES PATENT OFFICE.

CHARLES GRIFFIN, OF YPSILANTI, MICHIGAN.

COMBINED COFFEE AND TEA POT.

Application filed August 17, 1926. Serial No. 129,851.

This invention is a combined coffee and tea pot whereby coffee and tea may be prepared simultaneously and either beverage poured at will without any overflow from the other beverage. The invention provides a simple, efficient and compact device which may be easily handled and which will completely separate the two liquids during preparation of the same for use. The invention is illustrated in the accompanying drawing and will be hereinafter fully set forth.

Figure 1:
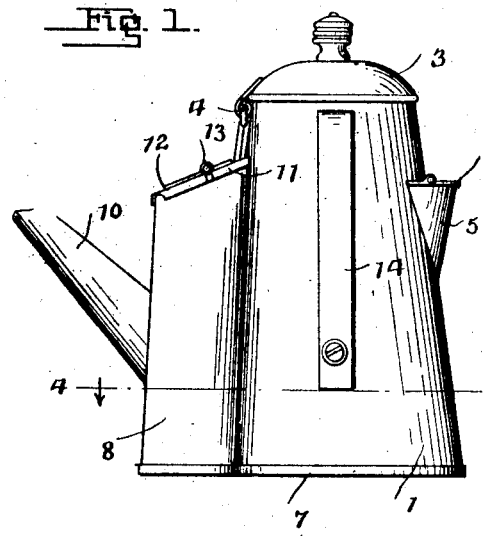
Figure 1 is an elevation of a coffee and tea pot embodying my present invention.
Figure 2:
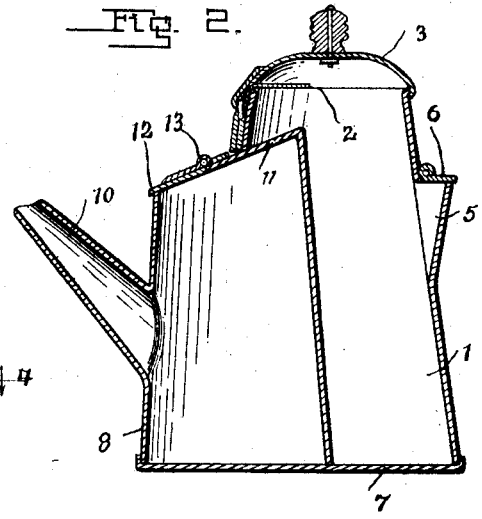
Fig. 2 is a central vertical section of the same.
Figure 3:
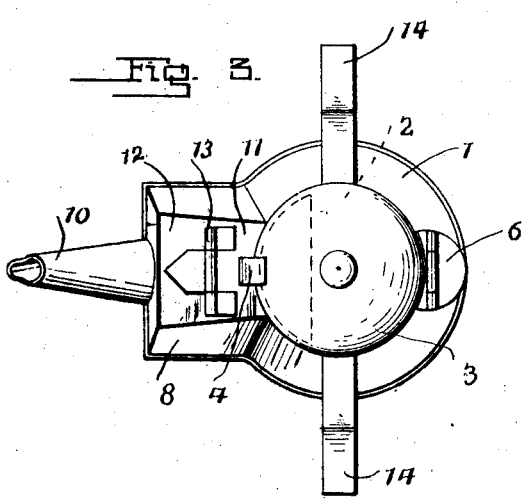
Fig. 3 is a top plan view thereof.
Figure 4:
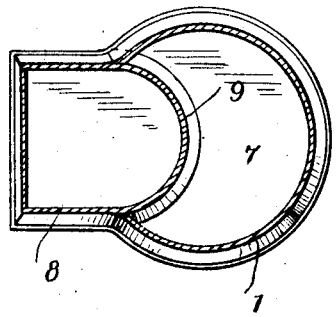
Fig. 4 is a horizontal section on the line 4—4 of Fig. 1.

The main body or container 1 constitutes the coffee pot and has a general circular horizontal section while it tapers upwardly, as shown in the drawing. At the top of the body 1 is secured an inwardly projecting guard 2 and upon the same side of the body is hinged a cover or lid 3 which is adapted to extend over the top of the body and completely close the same. At a proper point in the height of the body at the side thereof opposite the hinge 4 of the lid 3 is formed a spout 5 through which the coffee may be poured, and this spout is covered by a lid 6 hinged in any convenient manner upon the body and the spout at the junction of the same. The bottom 7 of the coffee pot extends laterally beyond the same so as to also form the bottom for the tea pot. The tea pot is preferably of a rectangular outline upwardly tapered, as shown at 8, but the inner wall of the tea pot is arcuate, as shown most clearly at 9 in Fig. 4, and projects into the body of the coffee pot, as shown in Figs. 2 and 4, the coffee pot thus partially housing the tea pot. From the outer side of the tea pot 8, a spout 10 projects upwardly and laterally to permit pouring of the tea, and at the top of the tea pot is a fixed cover or partition 11 which extends from the upper edge of the inner wall 9 downwardly and outwardly through the adjacent side of the coffee pot, and to the outer end edge of this fixed cover or partition is attached a swinging lid 12 by a hinge 13. The lid 12 permits the filling of the tea pot and also covers the top of the same while the tea is brewing. To facilitate pouring, a laterally disposed handle 14 is provided upon each side of the coffee pot and, as shown clearly in Fig. 3, these handles are disposed at diametrically opposite points and are substantially alined.

The separate chambers are filled through the tops thereof and the respective covers lowered so as to extend entirely over and close the tops in an obvious manner. The boiling or distilling of the liquids will be accomplished simultaneously and either liquid may be poured without any overflow from the other. To pour coffee, the proper handle 14 is grasped and the device tilted so that the coffee will flow out through the spout 5 and it will be obvious that, when the device is so tilted, the inner wall of the tea chamber will be likewise tilted and the fixed top or partition 11 will serve as a guard or barrier to prevent out pouring of the tea. When tea is to be poured, the device is tilted in the opposite direction so that the tea may flow out through the spout 10 and the liquid in the coffee chamber will then flow into the space between the side of said chamber and the arcuate wall of the tea chamber and will be prevented from escaping by the guard lip 2 which extends partly across the top of the coffee chamber and is disposed at the lower side thereof when pouring tea. It will be noted readily, especially upon reference to Fig. 3, that the spouts 6 and 10 are located at diametrically opposite sides of the device and are diametrically alined so that, when pouring takes place through either spout, the other spout will be disposed vertically over the spout which pours.

My device is compact and occupies very little more space than a coffee pot of the same dimensions would occupy alone and much less space than a coffee and tea pot of the same capacity would occupy if made separately and placed upon a stove side by side.

Having thus described the invention, I claim:

A combined coffee and tea pot comprising a coffee chamber provided at its top with an inwardly projecting guard lip and having a swinging cover adapted to extend over the entire top of the chamber above the said guard lip, a pouring spout for said chamber at an intermediate point of the height thereof and diametrically opposite the guard lip, a tea chamber set in the side of the coffee chamber diametrically opposite the pouring spout and closed to the coffee chamber, the top of the tea chamber comprising a fixed portion extending downwardly and outwardly through the side of the coffee chamber, and a swinging lid hinged to the free edge of said fixed portion to rest upon the outer wall of the tea chamber.

In testimony whereof I affix my signature.

CHARLES GRIFFIN. [L. S.]